US007810283B2

(12) United States Patent
Rapson

(10) Patent No.: US 7,810,283 B2
(45) Date of Patent: Oct. 12, 2010

(54) EXTERIOR POCKET DOOR

(76) Inventor: Steven C Rapson, 38257 Nixon Rd., Purcellville, VA (US) 20132

( * ) Notice: Subject to any disclaimer, the term of this patent is extended or adjusted under 35 U.S.C. 154(b) by 0 days.

(21) Appl. No.: 11/971,617

(22) Filed: Jan. 9, 2008

(65) Prior Publication Data

US 2008/0271392 A1 Nov. 6, 2008

Related U.S. Application Data

(60) Provisional application No. 60/915,563, filed on May 2, 2007.

(51) Int. Cl.
*B60J 1/16* (2006.01)

(52) U.S. Cl. .......................................... 49/372

(58) Field of Classification Search .................. 49/372, 49/116, 118, 120, 366, 370, 409, 410, 411
See application file for complete search history.

(56) References Cited

U.S. PATENT DOCUMENTS

| | | | | | |
|---|---|---|---|---|---|
| 133,359 | A | | 11/1872 | Darley | |
| 309,827 | A | | 12/1884 | Drake | |
| 1,442,397 | A | | 1/1923 | Gorrani | |
| 1,569,602 | A | | 1/1926 | Anderson | |
| 1,831,031 | A | * | 11/1931 | Pitcher | 52/210 |
| 2,026,886 | A | * | 1/1936 | Goeltz et al. | 49/372 |
| 2,378,666 | A | * | 6/1945 | Triller | 49/372 |
| 2,776,707 | A | | 1/1957 | Helwig | |
| 2,857,629 | A | * | 10/1958 | Walter et al. | 49/372 |
| 3,226,780 | A | | 1/1966 | Landis | |
| 3,318,047 | A | | 5/1967 | Carson | |
| 3,854,245 | A | * | 12/1974 | Anderson | 49/449 |
| 4,063,389 | A | * | 12/1977 | Leder | 49/370 |
| 4,167,088 | A | | 9/1979 | Governale | |
| 4,185,437 | A | * | 1/1980 | Robinson | 52/601 |
| 4,236,361 | A | * | 12/1980 | Boden | 52/204.1 |
| 4,561,210 | A | * | 12/1985 | Kvas et al. | 49/372 |
| 4,674,250 | A | * | 6/1987 | Altizer | 52/309.7 |
| 4,742,645 | A | * | 5/1988 | Johnston | 49/372 |
| 4,754,573 | A | * | 7/1988 | van Rooij et al. | 49/370 |
| 4,862,660 | A | * | 9/1989 | Raymond | 52/220.2 |
| 4,891,921 | A | | 1/1990 | Governale | |
| 6,438,912 | B1 | | 8/2002 | Avent | |
| 6,659,155 | B1 | | 12/2003 | Mlenek et al. | |

(Continued)

*Primary Examiner*—Katherine W Mitchell
*Assistant Examiner*—Catherine A Kelly
(74) *Attorney, Agent, or Firm*—Rossi, Kimms & McDowell LLP

(57) ABSTRACT

An exterior pocket door of simple design is provided that can be used for commercial and residential exterior building applications. The exterior pocket includes a door frame structure having a top head jamb coupled to a bottom sill plate by a left wall jamb and a right wall jamb. A first exterior wall panel and a second exterior wall panel are coupled to an outside face of the frame structure and a first interior wall panel and a second interior wall panel coupled to an inside face of the frame structure. A first sliding door unit and a second sliding door unit are mounted within the door frame structure to be moveable between an open position and a closed position. The first exterior wall panel and the first interior wall panel form a first pocket in which the first sliding door unit is located in the open position, and the second exterior wall panel and the second interior wall panel form a second pocket in which the second sliding door unit is located in the open position.

6 Claims, 6 Drawing Sheets

U.S. PATENT DOCUMENTS

| | | | |
|---|---|---|---|
| 6,826,867 | B1 | 12/2004 | McDonald et al. |
| 2003/0217817 | A1 | 11/2003 | Niehausmeier |
| 2004/0083653 | A1 | 5/2004 | Delgado et al. |
| 2007/0051048 | A1 | 3/2007 | Krohn et al. |

* cited by examiner

EXTERIOR POCKET DOOR

CROSS-REFERENCE OF RELATED APPLICATIONS

This application claims priority from U.S. Provisional Patent Application No. 60/915,563, filed on May 2, 2007, the contents of which are incorporated herein by reference.

BACKGROUND

The invention is related to exterior doors utilized in commercial and residential buildings. More specifically, the invention is related to an exterior pocket door that includes a door frame structure that holds two active sliding pocket door units configured to slide within pocket door receiving spaces provided within the door frame structure.

There are a number of conventional sliding doors that are and have been utilized as exterior doors in commercial and residential construction. U.S. Pat. No. 6,438,912, for example, discloses a conventional sliding door assembly that utilizes two fixed units that are fitted to an aperture of a building or a doorway, and two sliding units that are fitted to the interior of the building such that they can slide backwards and forwards behind the fixed units. In general, both the fixed units and the sliding units include glass panels in conventional sliding or patio doors to maximize window surface area. It is desirable in certain architectural designs, however, to maximize the amount of available interior wall space available. Accordingly, in such cases, it is not desirable to utilize a conventional door structure in which the fixed panels are glass as in the above-described example. Further, even if the fixed units in the above-referenced patent are made from solid panels, the glass sliding units still slide behind the fixed units rendering the interior wall surface unusable.

Other conventional sliding doors simply utilize a single sliding unit that slides in front of a fixed unit, both of which are made of glass. While this solves the problem of having the sliding unit obstruct an interior wall surface, the design fails to utilize the full space available to have a door opening. In other words, if the available glass surface area is six feet, such doors employ a three foot sliding door that slides behind a three foot fixed unit, whereas it would be desirable to utilize the full available six feet for an opening.

U.S. Pat. No. 4,754,573 attempts to address the problems associated with conventional sliding doors, and particularly the need for reserving room along the interior wall to allow space for a sliding door, by providing a sliding door unit that includes two door cabinets into which two sliding door panels slide into respectively. Similar conventional door units are sometimes referred to as “pocket doors”, because the sliding door panels are hidden within the cabinet or “pocket”. While the disclosed structure does provide some advantages, conventional pocket door structures have been generally been limited to interior building applications.

In view of the above, it would be desirable to provide a pocket door of simple design that could be used for commercial and residential exterior building applications. It would further be desirable to provide an exterior pocket door of modular design that can be easily inserted into an opening provided in a buildings exterior framing.

SUMMARY OF THE INVENTION

A pocket door of simple design is provided that can be used for commercial and residential exterior building applications.

The exterior pocket door is of a modular design that can be easily inserted into an opening provided in a buildings exterior framing or wall structure.

More specifically, an exterior pocket door is provided that includes a door frame structure having a top head jamb coupled to a bottom sill plate by a left wall jamb and a right wall jamb. A first exterior wall panel and a second exterior wall panel are coupled to an outside face of the frame structure and a first interior wall panel and a second interior wall panel coupled to an inside face of the frame structure. A first sliding door unit and a second sliding door unit are mounted within the door frame structure to be moveable between an open position and a closed position. The first exterior wall panel and the first interior wall panel form a first pocket in which the first sliding door unit is located in the open position, and the second exterior wall panel and the second interior wall panel form a second pocket in which the second sliding door unit is located in the open position.

In the illustrated embodiment, a sliding track provided on the sill plate, and the first sliding door unit and the second sliding door unit include rollers that fit within the sliding track, thereby enabling the doors to move along the track in a sliding motion. The first sliding door unit and the second sliding door unit also preferably include weather stripping on the bottoms thereof, and along extended side portions that fit behind the exterior wall panels, as well as glass panels.

In the disclosed preferred embodiment, the first exterior panel assembly and the second exterior panel assembly each include a panel frame, an exterior structure wall sheet mounted to a first side of the panel frame, and a water resistant structural panel mounted on a second side of the panel frame. Similarly, the first interior panel assembly and the second interior panel assembly each include a panel frame and a structural sheet mounted on a first side of the panel frame. In addition, first interior panel assembly and the second interior panel assembly preferably include flashing mounted on the structural sheet that protects the track provided on the sill plate.

BRIEF DESCRIPTION OF THE DRAWINGS

The invention will be described with reference to certain preferred embodiments and the accompanying drawings, wherein.

DETAILED DESCRIPTION OF PREFERRED EMBODIMENTS OF THE INVENTION

Figure 1:
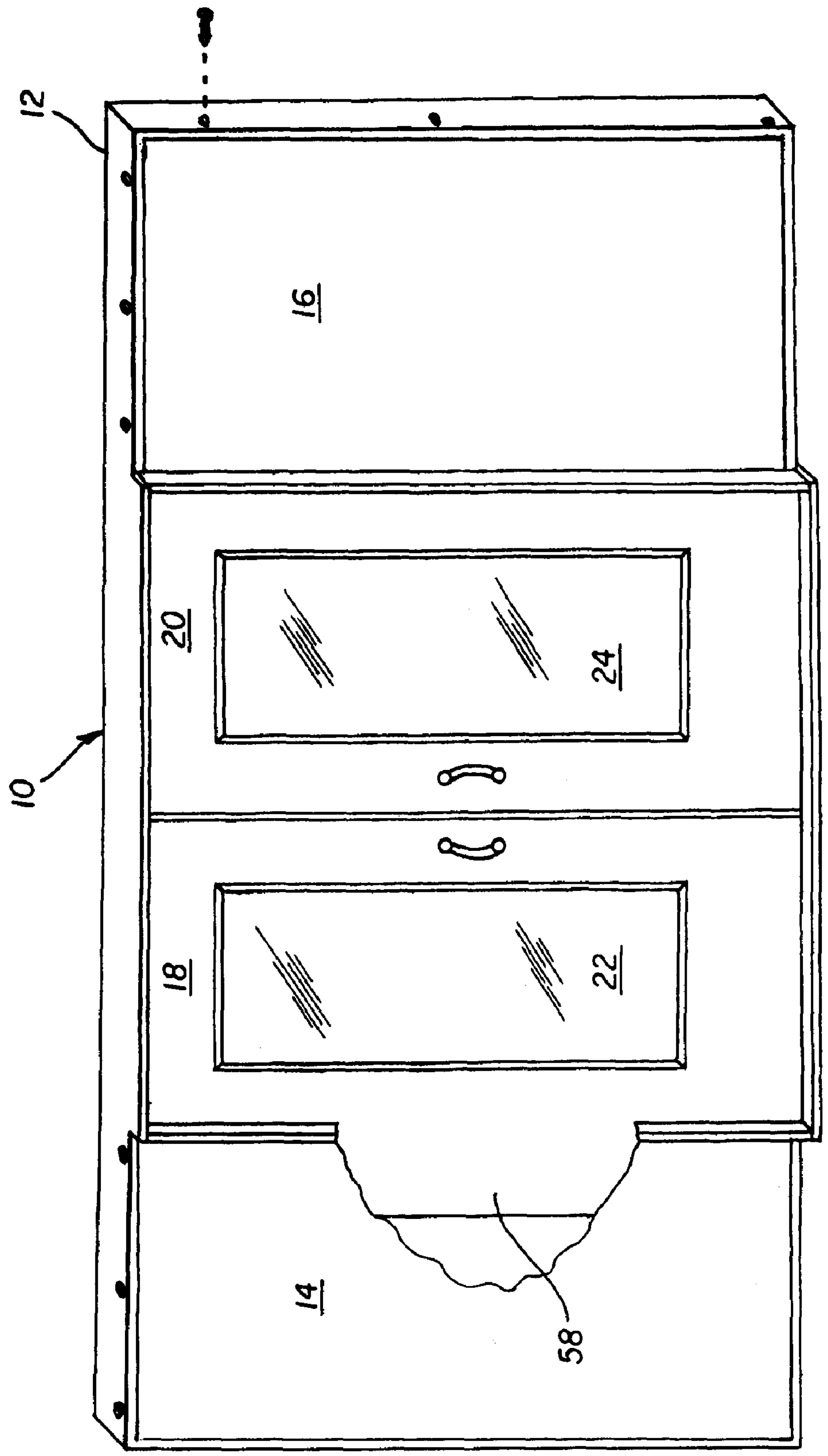
FIG. 1 is a front view of an exterior pocket door in accordance with the present invention.

FIG. 1 illustrates an exterior pocket door 10 in accordance with a preferred embodiment of the invention. The exterior pocket door 10 includes a door frame structure 12, a left exterior panel assembly 14 fastened to an exterior face of the door frame structure 12, a right exterior panel assembly 16 fastened to an exterior face of the door frame structure 12, a left sliding door unit 18, and a right sliding door unit 20.

Although not shown in the front view illustrated in FIG. 1, the exterior pocket door 10 also includes a left interior panel assembly and a right exterior panel assembly each fastened to an interior face of the frame structure 12, such that a interior pocket or receiving space is provided between the respective left and right exterior panel assemblies 14, 16 and the left and right interior panel assemblies.

The exterior pocket door 10 is illustrated with the left sliding door unit 18 and the right sliding door unit 20 in the closed position. When opened, however, the left sliding door unit 18 and the right sliding door unit 20 respectively slide behind the left exterior panel assembly 14 and the right exterior panel assembly 16, such that both sliding door units are totally concealed or substantially concealed within the door frame structure 12 of the exterior pocket door 10. It will be understood that the left sliding door unit 18 and the right sliding door unit 20 are independently operable, so that only one of the sliding door units can be opened if so desired.

In the embodiment shown in FIG. 1, the left sliding door unit 18 and the right sliding door unit 20 preferably include a left glass panel 22 and a right glass panel 24. It will be understood, however, that the sliding door units may be manufactured with or without glass panels and in any type of desired architectural style or design. The exterior pocket door 10 illustrated in FIG. 1, for example, is designed to appear similar in style to "French" doors, which are conventionally constructed to swing open and closed on hinges. While the exterior pocket door 10 maintains the same architectural appearance as a conventional French door, it provides the added utility of a sliding door instead of a hinged door.

Figure 2:
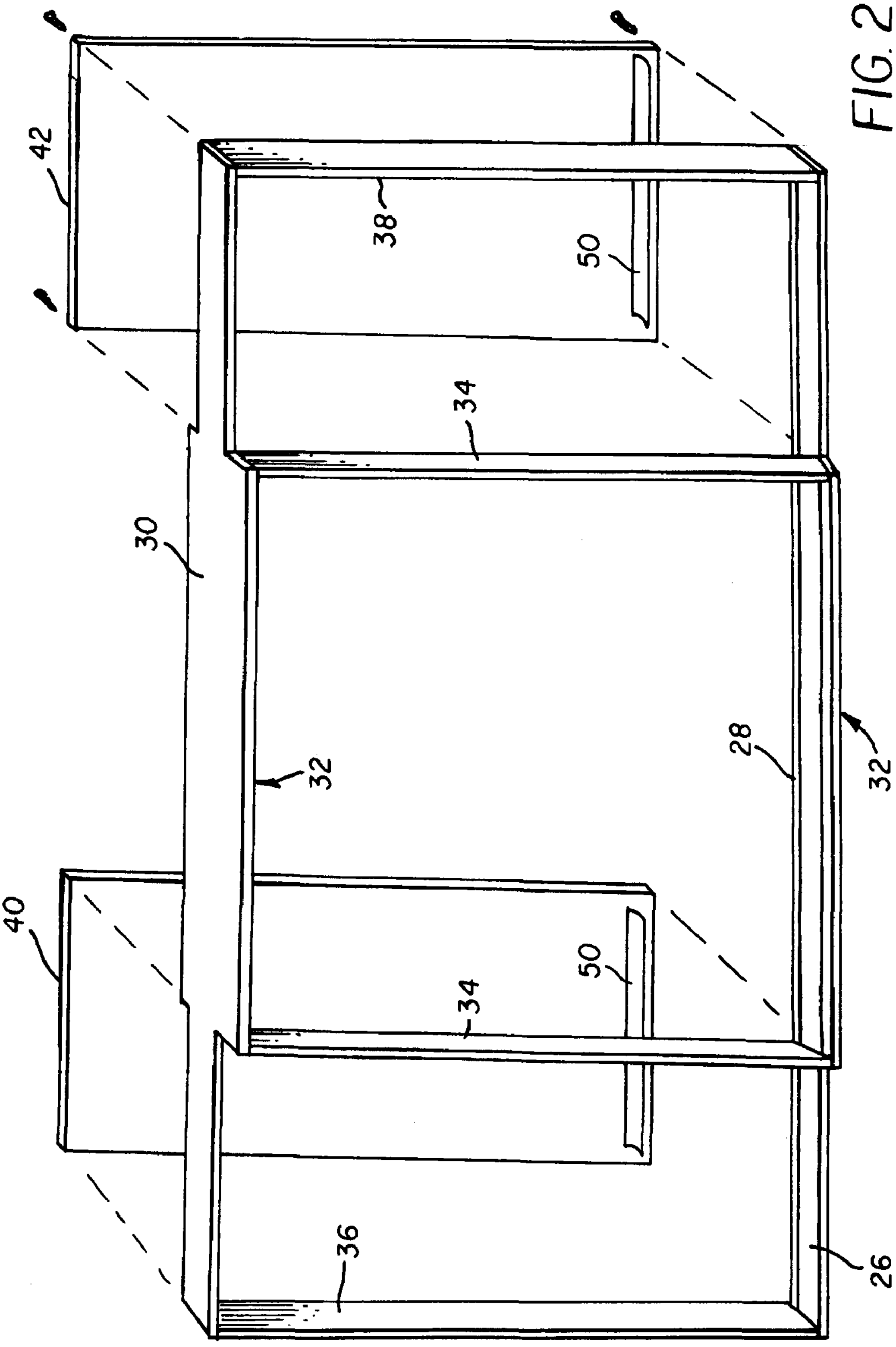
FIG. 2 is a front perspective view of a frame structure of the exterior pocket door illustrated in FIG. 1.

As shown in FIG. 2 the door frame structure 12 includes a bottom sill plate 26, on which a sliding track 28 is mounted, and a top head jamb 30. The bottom sill plate 26 and the top head jamb 30 include exterior facing extended portions 32 that are connected together by vertical cap members 34. When the exterior pocket door 10 is installed, the extended portions 32 and cap members 34 provide spacing to allow exterior finishes (brick, siding, etc.) to be properly tied into the door 10. The bottom sill plate 26 and the top head jamb 30 are primarily coupled together by a left interior wall jamb 36, a right interior wall jamb 38 and the cap members 34. Structural rigidity or integrity, however, is provided by mounting the left exterior panel assembly 14 and the right exterior panel assembly 16 to the exterior face of the frame structure 12 (as shown in FIG. 1), and still further by mounting the left interior panel assembly 40 and the right interior panel assembly 42 (illustrated in FIG. 2) to the inside face of the frame structure 12.

Figure 3:
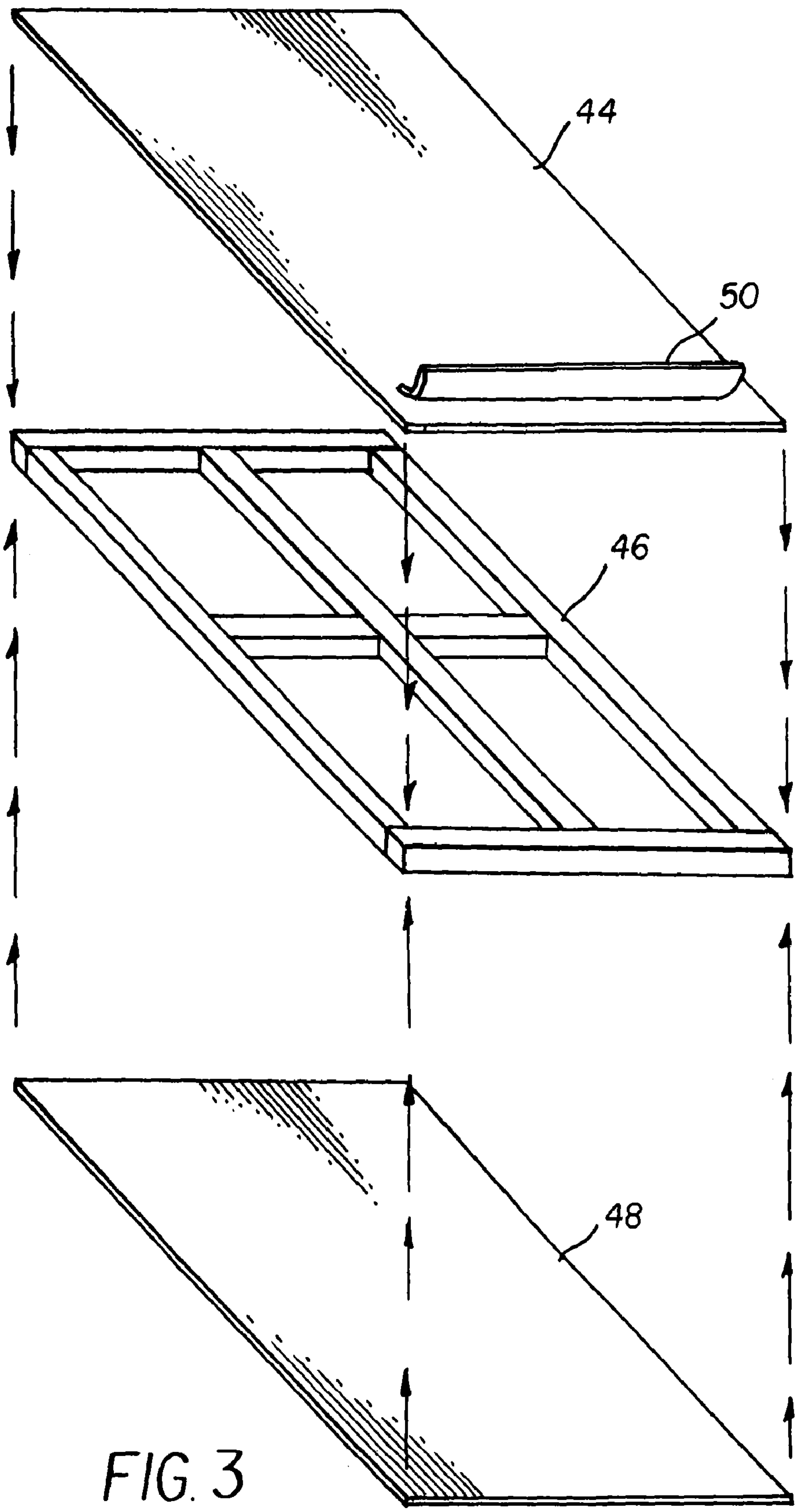
FIG. 3 is an exploded view of an interior panel assembly utilized in the exterior pocket door shown in FIG. 1.

The structure of the right interior panel assembly 40 and left interior panel assembly 42 is shown in FIG. 3. As shown in FIG. 3, the right and left interior panel assemblies 40, 42 include a ¼ inch structural sheet 44 (for example pine) and an interior panel frame 46 constructed from 1¼ inch framing members (also preferably pine). A dry wall sheet 48 is preferably applied to the panel frame 46 once the exterior pocket door 10 has been installed within a building opening, but the dry wall sheet 48 can also be installed during the manufacture of the exterior pocket door 10 such that it forms part of the modular structure. Further, flashing 50 is preferably provided on the structural sheet 44 that covers and protects the track 28 mounted on the bottom sill 26 when the panel is attached to the frame structure 12. Although not shown, insulation may be provided in the spaces between the framing members of the interior panel frame 46 prior to the installation of the dry wall sheet 44.

Figure 4:
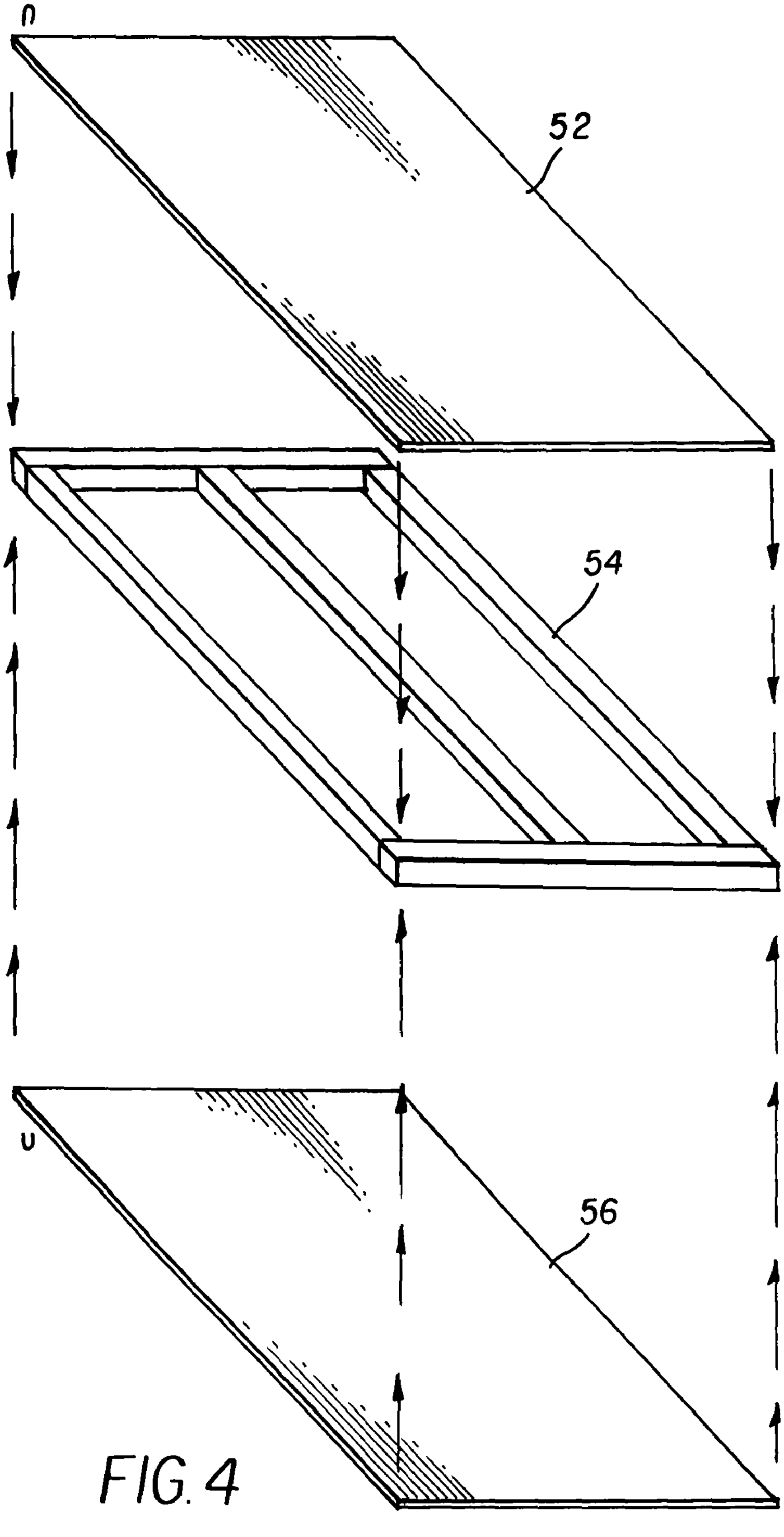
FIG. 4 is an exploded view of an exterior panel assembly utilized in the exterior pocket door shown in FIG. 1.

The structure of the right and left exterior panel assemblies 16, 18 is shown in FIG. 4. The right and left exterior panel assemblies 16, 18 include a ¼ inch thick structural wall sheeting 52 (for example THERMO-PLY), an exterior panel frame 54 constructed from 1¼ inch framing members, and a ¼ inch thick water resistant structural panel 56 (for example LUANA). Although not shown, insulation is preferably provided between the structural wall sheeting 52 and the water resistant structural panel 56 in the areas provided between the members of the exterior panel frame 44.

Figure 5A:
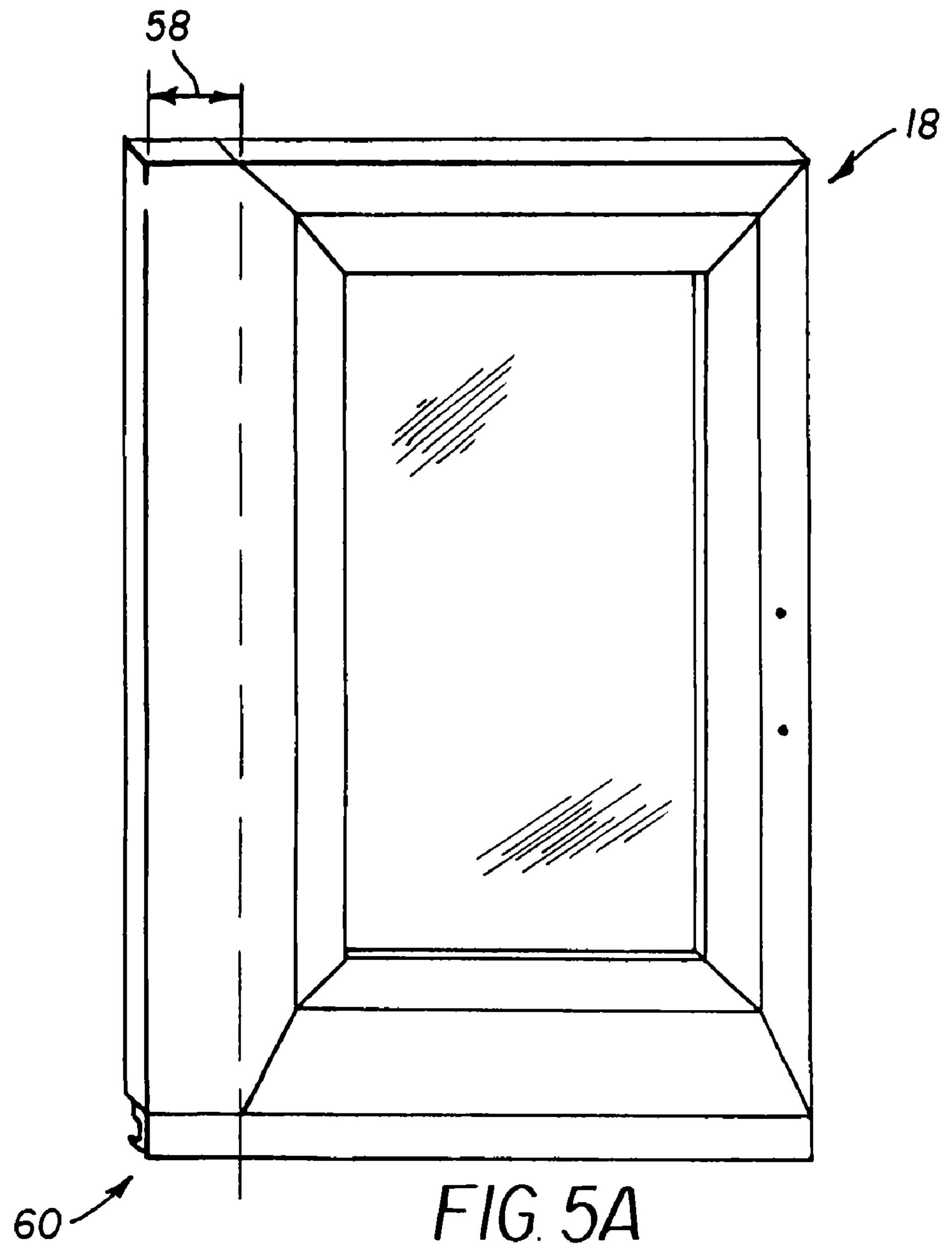
FIGS. 5A and 5B respectively illustrate a left sliding door unit utilized in the exterior pocket door shown in FIG. 1.
Figure 5B:
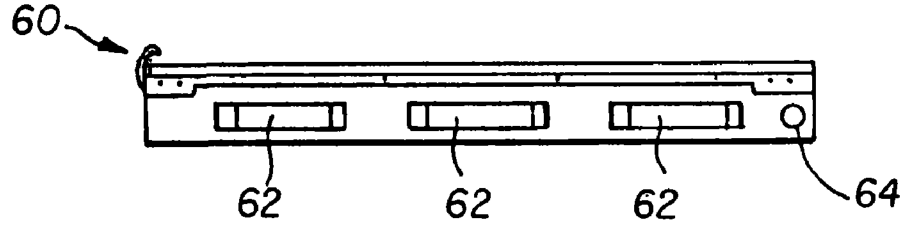
Figure 6A:
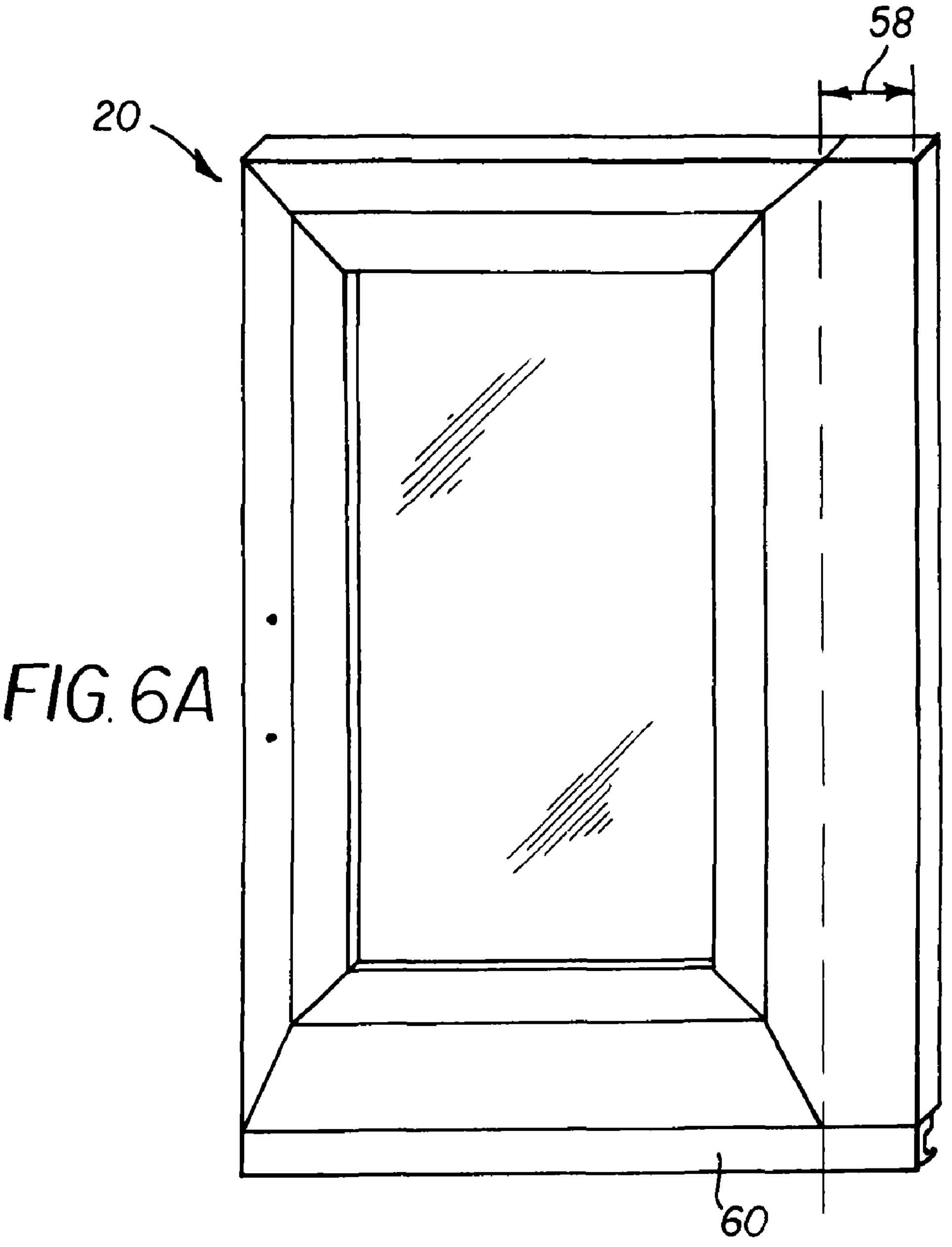
FIGS. 6A and 6B respectively illustrate a right sliding door unit utilized in the exterior pocket door shown in FIG. 1.
Figure 6B:
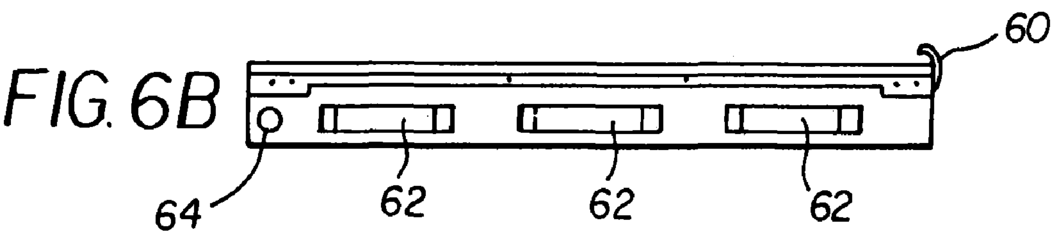

FIGS. 5A and 6A respectively illustrate the left sliding door unit 18 and right sliding door unit 20. The left and right sliding door units 18, 20 each include an offset portion 58 that is hidden behind their respective exterior panel assembly. Weather stripping 60 is preferably provided at the bottoms of the left and right sliding door units 18, 20 and along their edges that extends behind their respective exterior panel assembly. Rollers 62 are provided in the bottom of the left and right sliding door units 18, 20 that fit within the sliding track 28 provided on the bottom sill 26 as shown in FIGS. 5B and 6B. In addition, a locking mechanism 64 that extends into the bottom sill 26 may be included within one or both of the sliding door units 18, 20.

As will be readily appreciated by those skilled in the art, the installation of the left exterior panel assembly 14, the right exterior panel assembly 16, the left interior panel assembly 40 and the right interior panel assembly 42 form left and right pockets within the door frame structure 12 into which the left and right sliding door units 18, 20 can be moved along the track 28. In contrast to conventional exterior sliding doors primarily made of glass panels, the exterior pocket door 10 provides additional interior wall space through the provision of the interior panel assemblies to which drywall is attached. Further, the door 10 can take the form of any desired architectural style, thereby allowing for the convenience of a sliding door feature while maintaining a more traditional architectural look.

The invention has been described with reference to certain preferred embodiments thereof. It will be understood, however, that modifications and variations are possible within the scope of the appended claims. For example, the left and right exterior wall panels 14, 16 and the left and right interior wall panels 40, 42 may be attached to the outside edge surfaces of the door frame structure 12 such that fasteners are driven through the exterior and interior wall panels and into the edge faces to secure the panels, or the left and right exterior wall panels 14, 16 and the left and right interior wall panels 40, 42 may be fit within the door frame structure 12 such that fasteners are driven through the structural elements of the door frame structure 12 and into the frame members of the interior and exterior panels to secure the panels. In either case, the various thicknesses and widths of the components of the exterior pocket door 10 are adjusted so that the door can fit within an opening provided in a building and properly align with the walls of the building. Further, while the left and right sliding door units are independently operable in the illustrated preferred embodiment, the operation of the left and right sliding door units can be tied together, for example by the use of a cable system, such that opening of one of the sliding door units causes the other sliding door unit to open in the same manner.

What is claimed is:

1. An exterior pocket door comprising:

a frame structure including a top head jamb coupled to a bottom sill plate by a left wall jamb and a right wall jamb;

a first exterior wall panel assembly and a second exterior wall panel assembly that fit within the frame structure, wherein fasteners are driven through the frame structure and into and first and second exterior wall panel assemblies to secure the first and second exterior wall panel assemblies to the frame structure;

a first interior wall panel assembly and a second interior wall panel assembly attached to the outside edge surfaces of the frame structure, wherein fasteners are driven through the first and second interior wall panel assemblies and into the outside edge surfaces to secure the first and second interior wall panel assemblies to the frame structures;

a sliding track provided on the sill plate; and a first sliding door unit and a second sliding door unit mounted within the frame structure to be moveable between an open position and a closed position on rollers provided in the first sliding door unit and the second sliding door unit, wherein the rollers ride on the sliding track;

wherein the first exterior wall panel assembly and the first interior wall panel assembly form a first pocket in which the first sliding door unit is located in the open position;

wherein the second exterior wall panel assembly and the second interior wall panel assembly form a second pocket in which the second sliding door unit is located in the open position;

wherein the first exterior wall panel assembly and the second exterior wall panel assembly each include a panel frame and an exterior structure wall sheet mounted to a first side of the panel frame and a water resistant structural panel mounted on a second side of the panel frame; and wherein the first interior wall panel assembly and the second interior wall panel assembly each include a panel frame and a structural sheet mounted on a first side of the panel frame.

2. An exterior pocket door as claimed in claim 1, wherein the first sliding door unit and the second sliding door unit include weather stripping on the bottoms thereof.

3. An exterior pocket door as claimed in claim 1, wherein the first sliding door unit and the second sliding door unit respectively include a first glass panel and a second glass panel.

4. An exterior pocket door as claimed in claim 1, wherein the first interior panel assembly and the second interior panel assembly include flashing located on a bottom portion of the structural sheet.

5. An exterior pocket door as claimed in claim 1, wherein the top head jamb and the bottom sill plate include extended portions that extend past the first exterior wall panel and the second exterior wall panel.

6. An exterior pocket door as claimed in claim 5, further comprising cap members connected between the extended portion of the top head jamb and the extended portion of the bottom sill plate.

* * * * *